United States Patent
Shimomura

(10) Patent No.: US 10,315,374 B2
(45) Date of Patent: Jun. 11, 2019

(54) PNEUMATIC TIRE MANUFACTURING METHOD AND PNEUMATIC TIRE

(71) Applicant: TOYO TIRE & RUBBER CO., LTD., Osaka-shi, Osaka (JP)

(72) Inventor: Kazuo Shimomura, Osaka (JP)

(73) Assignee: TOYO TIRE CORPORATION, Itami-shi (JP)

(*) Notice: Subject to any disclaimer, the term of this patent is extended or adjusted under 35 U.S.C. 154(b) by 92 days.

(21) Appl. No.: 14/261,108

(22) Filed: Apr. 24, 2014

(65) Prior Publication Data
US 2015/0090381 A1   Apr. 2, 2015

(30) Foreign Application Priority Data

Sep. 30, 2013 (JP) .................................. 2013-203810

(51) Int. Cl.
*B29D 30/00* (2006.01)
*B29D 30/30* (2006.01)
(Continued)

(52) U.S. Cl.
CPC ..... *B29D 30/3028* (2013.01); *B29D 30/3035* (2013.01); *B29D 30/60* (2013.01);
(Continued)

(58) Field of Classification Search
CPC ............ B29D 30/1621; B29D 30/1625; B29D 30/3021; B29D 30/3028; B29D 30/36; B29D 2030/1678; B29D 2030/3078
See application file for complete search history.

(56) References Cited

U.S. PATENT DOCUMENTS 5,720,831 A * 2/1998 Aoki .................. B60O 11/01
152/29
2001/0035255 A1 11/2001 Sergel et al.
(Continued)

FOREIGN PATENT DOCUMENTS

CN     101772426 A     7/2010
EP     0 950 506 A2    10/1999
(Continued)

OTHER PUBLICATIONS

Machine generated English language translation of JP 2004-216725 (original document dated Aug. 2004).*
(Continued)

*Primary Examiner* — Timothy Kennedy
(74) *Attorney, Agent, or Firm* — Westerman, Hattori, Daniels & Adrian, LLP

(57) ABSTRACT

A method of manufacturing a pneumatic tire has a winding step of forming a rubber ribbon winding body constructing a tread rubber by spirally winding a rubber ribbon obtained by co-extruding a first rubber and a second rubber which are different in hardness. The first rubber is mainly arranged in a first area by making a cross sectional area ratio of the first rubber greater than that of the second rubber. The second rubber is mainly arranged in a second area by making the cross sectional area ratio of the first rubber smaller than that of the second rubber. The cross sectional area ratio of the first rubber becomes progressively smaller in a part of the first area as the second area approaches. The rubber ribbon retains an interface boundary between the first rubber and the second rubber to at least a part of the second area.

4 Claims, 7 Drawing Sheets

(51) Int. Cl.
  *B60C 11/00*     (2006.01)
  *B29D 30/60*     (2006.01)
  *B29C 48/18*         (2019.01)
  *B29K 21/00*         (2006.01)
  *B29C 48/07*         (2019.01)
  *B29C 48/12*         (2019.01)
  *B29C 48/00*         (2019.01)
  *B29C 48/21*         (2019.01)
  *B29C 48/375*        (2019.01)
  *B29C 48/49*         (2019.01)

(52) U.S. Cl.
  CPC ...... *B60C 11/0008* (2013.01); *B60C 11/0041* (2013.01); *B60C 11/0066* (2013.01); *B29C 48/0021* (2019.02); *B29C 48/07* (2019.02); *B29C 48/12* (2019.02); *B29C 48/18* (2019.02); *B29C 48/21* (2019.02); *B29C 48/387* (2019.02); *B29C 48/49* (2019.02); *B29C 2948/9258* (2019.02); *B29C 2948/9259* (2019.02); *B29C 2948/92885* (2019.02); *B29C 2948/92933* (2019.02); *B29C 2948/92952* (2019.02); *B29K 2021/00* (2013.01); *B60C 2011/0025* (2013.01); *B60C 2011/0091* (2013.01)

(56) References Cited

U.S. PATENT DOCUMENTS

| | | | | |
|---|---|---|---|---|
| 2006/0096696 | A1* | 5/2006  | Oku ........................ | B29C 47/06 156/117 |
| 2008/0314505 | A1* | 12/2008 | Nishitani ........... | B29D 30/3028 156/123 |
| 2009/0229738 | A1* | 9/2009  | Lo Presti ............ | B29C 47/0019 156/117 |
| 2009/0314401 | A1* | 12/2009 | Hitotsuyanagi .... | B29D 30/3028 152/152.1 |
| 2010/0178444 | A1* | 7/2010  | Mafune .............. | B29D 30/3021 428/37 |
| 2010/0230020 | A1  | 9/2010  | Yoshinaka et al. | |
| 2010/0258227 | A1* | 10/2010 | Kuroki ............... | B29D 30/3028 152/209.5 |
| 2011/0048600 | A1* | 3/2011  | Yogou .................... | B60C 11/00 152/209.5 |
| 2012/0205020 | A1* | 8/2012  | Kawakami ............. | B60C 19/08 152/548 |
| 2013/0133811 | A1  | 5/2013  | Inoue et al. | |

FOREIGN PATENT DOCUMENTS

| | | | | |
|---|---|---|---|---|
| EP | 2179871       | * | 4/2010  | ............. B60C 15/06 |
| JP | 03-220007     | * | 9/1991  | ............. B60C 15/06 |
| JP | 2001-50435    | * | 2/2001  | ............. F16L 11/08 |
| JP | 2002-355878   | * | 12/2002 | ............. B29C 47/56 |
| JP | 2004-216725   | * | 8/2004  | ............. B29D 30/62 |
| JP | 2006-327255 A |   | 12/2006 | |
| JP | 2009-35229 A  |   | 2/2009  | |
| JP | 2010-47211    | * | 3/2010  | ............. B60C 11/04 |
| JP | 2013-111788 A |   | 6/2013  | |

OTHER PUBLICATIONS

Machine generated English language translation of JP 2001-50435 (original document dated Feb. 2001).*
English language Abstract of JP 03-220007 (original document dated Sep. 1991).*
English language translation of JP 03-220007 (original document dated Sep. 1991).*
Machine generated English language translation of JP 2010-47211 (original document dated Mar. 2010).*
Machine generated English language translation of JP 2002-355878 (original document dated Dec. 2002).*
Office Action dated May 3, 2016, issued in counterpart Chinese Patent Application No. 201410174693.6, with English translation. (23 pages).
Office Action dated Mar. 24, 2016, issued in counterpart German Patent Application No. 10 2014 113 7795, with English translation (14 pages).

* cited by examiner

--Prior Art--

--Prior Art--

PNEUMATIC TIRE MANUFACTURING METHOD AND PNEUMATIC TIRE

BACKGROUND OF THE INVENTION

Field of the Invention

The present invention relates to a pneumatic tire manufacturing method including a step of forming a tread rubber according to a ribbon winding construction method, and a pneumatic tire manufactured by the method.

Description of the Related Art

As disclosed in Patent Documents 1 and 2, there has been known a divided tread in which a tread rubber is divided into a plurality of areas in a tread width direction, and rubbers which are different in hardness or a modulus are arranged in the areas.

FIG. 8 shows a tread rubber 80 divided into three areas including a center area which becomes a center portion in the tread width direction, and a pair of shoulder areas which become end portions in the tread width direction. This kind of divided tread promotes a performance share by the center area and the shoulder areas. For example, the tire described in Patent Document 1 intends to improve ride comfort performance and noise performance while securing steering stability performance by arranging a hard rubber in the center area and arranging a soft rubber in the shoulder areas.

FIG. 9 shows a tread rubber 90 divided into two areas including an area in one side in a tread width direction, and an area in the other side in the tread width direction. This kind of divided tread promotes a performance share by an inside area which becomes an inner side of a vehicle at an installing time to the vehicle, and an outside area which becomes an outer side of the vehicle at the installing time to the vehicle. For example, the tire described in Patent Document 2 intends to improve an anti-rollover characteristic of the tire while securing steering stability performance by arranging a rubber having a high modulus in the inside area and arranging a rubber having a low modulus in the outside area.

The inventor of the present invention has found the following problems (1) and (2) with regard to the conventional divided tread as mentioned above.

(1) Since the linearly formed dividing surface vertically divides the tread rubber, there is a tendency that a rapid hardness change is caused between the areas sandwiching the dividing surface. Patent Document 1 discloses the formation of the tread rubber according to a so-called ribbon winding construction method, however, the dividing surface is formed linear just all the same. The ribbon winding construction method is a construction method of forming a rubber member such as a tread rubber by spirally winding an uncured rubber ribbon.

(2) Since a specific rubber is singly arranged in the shoulder area or the outside area, there is a case that an effect of improving the performance is not sufficient. For example, in the tread rubber 80 in FIG. 8, in the case that a hard rubber 81 is arranged in the center area for enhancing the steering stability performance, and a soft rubber 82 is arranged in the shoulder areas for enhancing the ride comfort performance and the noise performance, the steering stability performance is improved in a low load area, however, the steering stability performance in a high load area tends to be lowered. This is because a contribution made to the steering stability performance in the high load area is great in the shoulder area, and the same tendency can be seen in the outside area in the tread rubber 90 in FIG. 9.

PRIOR ART DOCUMENT

Patent Document

Patent Document 1: JP-A-2009-35229
Patent Document 2: JP-A-2006-327255

SUMMARY OF THE INVENTION

The present invention has been made in view of the actual condition mentioned above, and an object of the present invention is to provide a pneumatic tire manufacturing method capable of easily forming a tread rubber which can solve the above problems (1) and (2) according to a ribbon winding construction method, and a pneumatic tire which is manufactured by the method.

The object can be achieved by the following present invention. The present invention provides a method of manufacturing a pneumatic tire having a tread rubber, the method comprising a winding step of forming a rubber ribbon winding body constructing the tread rubber by spirally winding a rubber ribbon obtained by co-extruding a first rubber and a second rubber which are different in hardness, wherein the winding step differentiates the mainly arranged rubber between a first area positioned in a center portion and a second area positioned in an end portion in a tread width direction, or between a first area positioned in one side and a second area positioned in the other side in the tread width direction, wherein the first rubber is mainly arranged in the first area by making a cross sectional area ratio of the first rubber in relation to the rubber ribbon greater than a cross sectional area ratio of the second rubber, wherein the second rubber is mainly arranged in the second area by making the cross sectional area ratio of the first rubber in relation to the rubber ribbon smaller than the cross sectional area ratio of the second rubber, wherein a portion in which the cross sectional area ratio of the first rubber in relation to the rubber ribbon becomes smaller by smaller is provided from the first area toward the second area, and wherein the rubber ribbon retaining a compound interface between the first rubber and the second rubber is superposed and wound in a tread thickness direction to at least a part of the second area.

According to the method, the tread rubber is formed according to the ribbon winding construction method, the tread rubber in which the first rubber is mainly arranged in the first area, and the second rubber is mainly arranged in the second area. Since the tread rubber is similar to the divided treads like those in FIGS. 8 and 9, with regard to an overall arrangement of the first rubber and the second rubber, the tread rubber can promote the performance share between the center area and the shoulder areas, or between the inside area and the outside area. In addition, it is possible to easily form the tread rubber which can enhance the effect of improving the performance while suppressing a rapid hardness change between the areas.

In the method of manufacturing a pneumatic tire in accordance with the present invention, it is preferable that the winding step forms a surface of the first area by the first rubber, and forms a surface of the second area by the second rubber. Accordingly, it is possible to accurately promote the performance share between the first area and the second area in relation to the ride comfort performance and the noise performance which are greatly affected by an input from a road surface, or the characteristic which is greatly contributed by the rubber coming into contact with the road surface, for example, cornering power (CP) and a self-aligning torque (SAT) in the low load area.

In the method of manufacturing a pneumatic tire in accordance with the present invention, it is preferable that the rubber ribbon has a flat cross sectional shape in which a thickness is smaller than a width, and the compound interface sections the rubber ribbon in the thickness direction, and the winding step winds the rubber ribbon in such a manner that the rubber ribbons which are adjacent in the tread width direction are partly superposed with each other. Accordingly, the first rubber and the second rubber are superposed in layers on the boundary of the compound interface, and the rubber ribbon retaining the compound interface is superposed in a tread thickness direction so as to be wound, whereby the first rubber and the second rubber are superposed in layers on the boundary of the ribbon interface. As a result, the first rubber and the second rubber are arranged in a multilayer manner such as a millefeuille, and are of help to enhance the effect of improving the performance.

In an aspect of the method of manufacturing a pneumatic tire in accordance with the present invention, the first rubber is harder than the second rubber, and the first area is a center area which is positioned in a center portion in the tread width direction, and the second area is a shoulder area which is positioned in an end portion in the tread width direction.

In this case, the steering stability performance in the low load area is secured by the hard first rubber being mainly arranged in the center area, and the ride comfort performance and the noise performance are improved by the soft second rubber being mainly arranged in the shoulder area. Further, since the first rubber is arranged in the shoulder area while the second rubber is mainly arranged, the rigidity of a land portion such as a block is improved in comparison with the case that the second rubber is singly arranged in the shoulder area, so that vibration damping performance of the land portion is improved. As a result, the ride comfort performance is improved as well as the steering stability performance in the high load area is improved.

In the other aspect of the method of manufacturing a pneumatic tire in accordance with the present invention, the tread rubber is provided for manufacturing a pneumatic tire in which an installing direction to a vehicle is designated, the first rubber is harder than the second rubber, and the first area becomes positioned on an inner side of the vehicle when installed to the vehicle, and the second area becomes positioned on an outer side of the vehicle when installed to the vehicle.

In this case, the steering stability performance in the low load area is secured by the hard first rubber being mainly arranged in the inside area, and the ride comfort performance and the noise performance are improved by the soft second rubber being mainly arranged in the outside area. Further, since the first rubber is arranged in the outside area along with the second rubber, the rigidity of a land portion such as a block is improved in comparison with the case that the second rubber is singly arranged in the outside area, so that vibration damping performance of the land portion is improved. As a result, the ride comfort performance is improved as well as the steering stability performance in the high load area is improved.

In the method of manufacturing a pneumatic tire in accordance with the present invention, it is preferable that a difference in JISA hardness between the first rubber and the second rubber is equal to or more than 2 degrees, or a difference in 300% tension modulus between the first rubber and the second rubber is equal to or more than 1.0 MPa. As a result, the performance share between the first area and the second area can be effectively promoted.

Further, the present invention provides a pneumatic tire comprising a tread rubber, wherein the tread rubber is constructed by a rubber ribbon winding body which is formed by spirally winding a rubber ribbon obtained by combining a first rubber and a second rubber which are different in hardness, wherein the mainly arranged rubber is different between a first area positioned in a center portion and a second area positioned in an end portion in a tread width direction, or between a first area positioned in one side and a second area positioned in the other side in the tread width direction, wherein the first rubber is mainly arranged in the first area since a cross sectional area ratio of the first rubber in relation to the rubber ribbon is greater than a cross sectional area ratio of the second rubber, wherein the second rubber is mainly arranged in the second area since the cross sectional area ratio of the first rubber in relation to the rubber ribbon is smaller than the cross sectional area ratio of the second rubber, wherein a portion in which the cross sectional area ratio of the first rubber in relation to the rubber ribbon becomes smaller by smaller is provided from the first area toward the second area, and wherein the rubber ribbon retaining a compound interface between the first rubber and the second rubber is superposed and wound in a tread thickness direction to at least a part of the second area.

The tire is provided with the tread rubber in which the first rubber is mainly arranged in the first area and the second rubber is mainly arranged in the second area. Since the tread rubber is similar to the divided treads as shown in FIGS. 8 and 9, with regard to the overall arrangement of the first rubber and the second rubber, it is possible to promote the performance share between the center area and the shoulder areas, or between the inside area and the outside area.

In the pneumatic tire in accordance with the present invention, it is preferable that a surface of the first area is formed by the first rubber, and a surface of the second area is formed by the second rubber. Accordingly, it is possible to accurately promote the performance share between the first area and the second area in relation to the ride comfort performance and the noise performance which are greatly affected by an input from a road surface, or the characteristic which is greatly contributed by the rubber coming into contact with the road surface, for example, CP and SAT in the low load area.

In an aspect of the pneumatic tire in accordance with the present invention, the first rubber is harder than the second rubber, and the first area is a center area which is positioned in a center portion in the tread width direction, and the second area is a shoulder area which is positioned in an end portion in the tread width direction.

In this case, the steering stability performance in the low load area is secured by the hard first rubber being mainly arranged in the center area, and the ride comfort performance and the noise performance are improved by the soft second rubber being mainly arranged in the shoulder area. Further, since the first rubber is arranged in the shoulder area while the second rubber is mainly arranged, the rigidity of a land portion such as a block is improved in comparison with the case that the second rubber is singly arranged in the shoulder area, so that vibration damping performance of the land portion is improved. As a result, the ride comfort performance is improved as well as the steering stability performance in the high load area is improved, and it is possible to achieve both the performances in the high order.

In the other aspect of the pneumatic tire in accordance with the present invention, an installing direction to a vehicle is designated in the pneumatic tire, the first rubber is harder than the second rubber, and the first area is an inside area which is positioned in one side in the tread width direction becoming an inner side of the vehicle at the installing time to the vehicle, and the second area is an outside area which is positioned in the other side in the tread width direction becoming an outer side of the vehicle at the installing time to the vehicle.

In this case, the steering stability performance in the low load area is secured by the hard first rubber being mainly arranged in the inside area, and the ride comfort performance and the noise performance are improved by the soft second rubber being mainly arranged in the outside area. Further, since the first rubber is arranged in the outside area while the second rubber is mainly arranged, the rigidity of a land portion such as a block is improved in comparison with the case that the second rubber is singly arranged in the outside area, so that vibration damping performance of the land portion is improved. As a result, the ride comfort performance is improved as well as the steering stability performance in the high load area is improved, and it is possible to achieve both the performances in the high order.

DETAILED DESCRIPTION OF THE PREFERRED EMBODIMENTS

An embodiment of the present invention will be explained with reference to the drawings. A pneumatic tire manufacturing method according to the present invention has the following winding step with regard to a formation of a tread rubber, a pneumatic tire according to the present invention has a tread rubber having the following structure, and the others can be executed in the same manner as the conventional ones.

Accordingly, a description will be given mainly of the formation and the structure of the tread rubber, and a detailed description of the others will not be given.

First Embodiment

Figure 1:
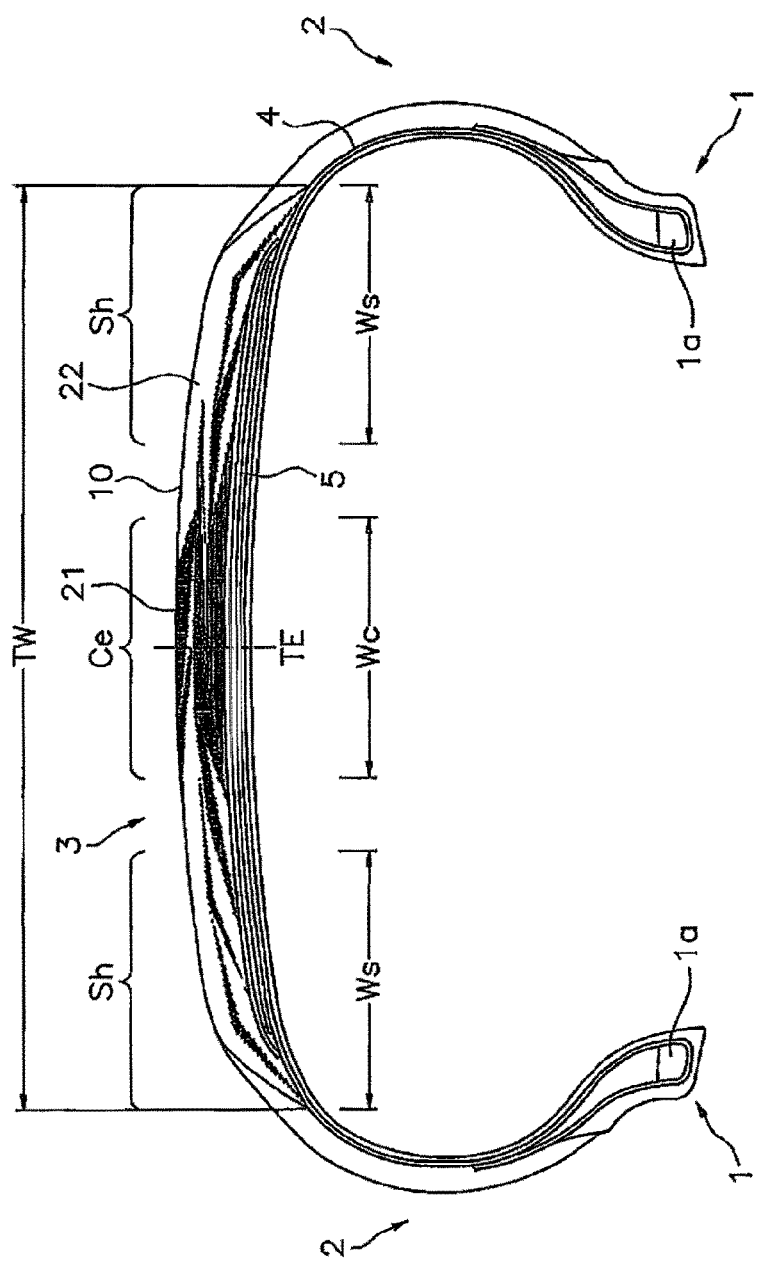
FIG. 1 is a cross sectional view of a tire meridian showing one example of a pneumatic tire according.

A pneumatic tire shown in FIG. 1 is provided with a pair of bead portions 1, side wall portions 2 each of which extends to an outer side in a tire diametrical direction from the bead portions 1, and a tread portion 3 which is connected to an outer end in the tire diametrical direction of each of the side wall portions 2. A reinforcing member such as a belt 5 is arranged in an outer periphery of a carcass 4 which is formed into a toroidal shape, and a tread rubber 10 is provided so as to cover the reinforcing member. Although an illustration is omitted, an outer peripheral surface of the tread rubber 10 is provided with groove portions such as longitudinal grooves and lateral grooves, and a land portion such as a block which is sectioned by the groove portions, and a tread pattern is formed in correspondence to requested tire performance and conditions for use.

The tread rubber 10 is constructed by a rubber ribbon winding body which is formed by spirally winding a rubber ribbon, and is formed according to a ribbon winding construction method as mentioned later. In the tread rubber 10, rubbers mainly arranged are different between a center area Ce (corresponding to a first area) which is positioned in a center portion in a tread width direction, and shoulder areas Sh (corresponding to a second area) which are positioned in end portions in the tread width direction. In other words, a rubber 21 (corresponding to a first rubber) is mainly arranged in the center area Ce, and a rubber 22 (corresponding to a second rubber) is mainly arranged in the shoulder areas Sh.

The center area Ce is an area which centers on a tire equator TE and has a width Wc, and the width Wc is preferably 20% of a tread width TW, and more preferably 30%. The mainly arranged of the rubber 21 in the center area Ce means that a cross sectional area ratio of the rubber 21 to the tread rubber 10 in the center area Ce is equal to or more than 50%, and the cross sectional area ratio is preferably equal to or more than 60%, and more preferably equal to or more than 70%. A surface of the center area Ce is formed by the rubber 21, however, the rubber 22 may be exposed in a part of the surface.

The shoulder area Sh is an area which has a width Ws based on the tread ends, and the width Ws is preferably 20% of the tread width TW, and more preferably 30%. The mainly arranged of the rubber 22 in the shoulder area Sh means that a cross sectional area ratio of the rubber 22 to the tread rubber 10 in the shoulder area Sh is equal to or more than 50%, and the cross sectional area ratio is preferably equal to or more than 60%, and more preferably equal to or more than 70%. A surface of the shoulder area Sh is formed by the rubber 22, however, the rubber 21 may be exposed in a part of the surface.

Figure 2:
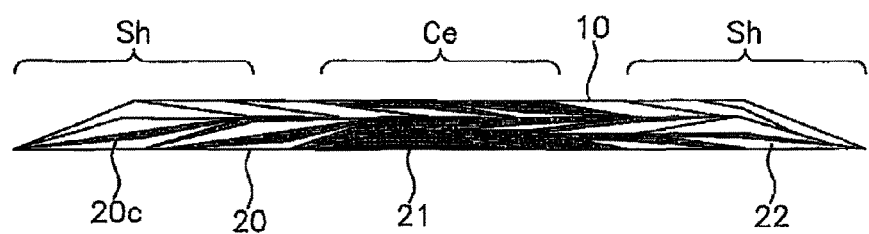
FIG. 2 is a cross sectional view showing a tread rubber before being cured.
Figure 3:
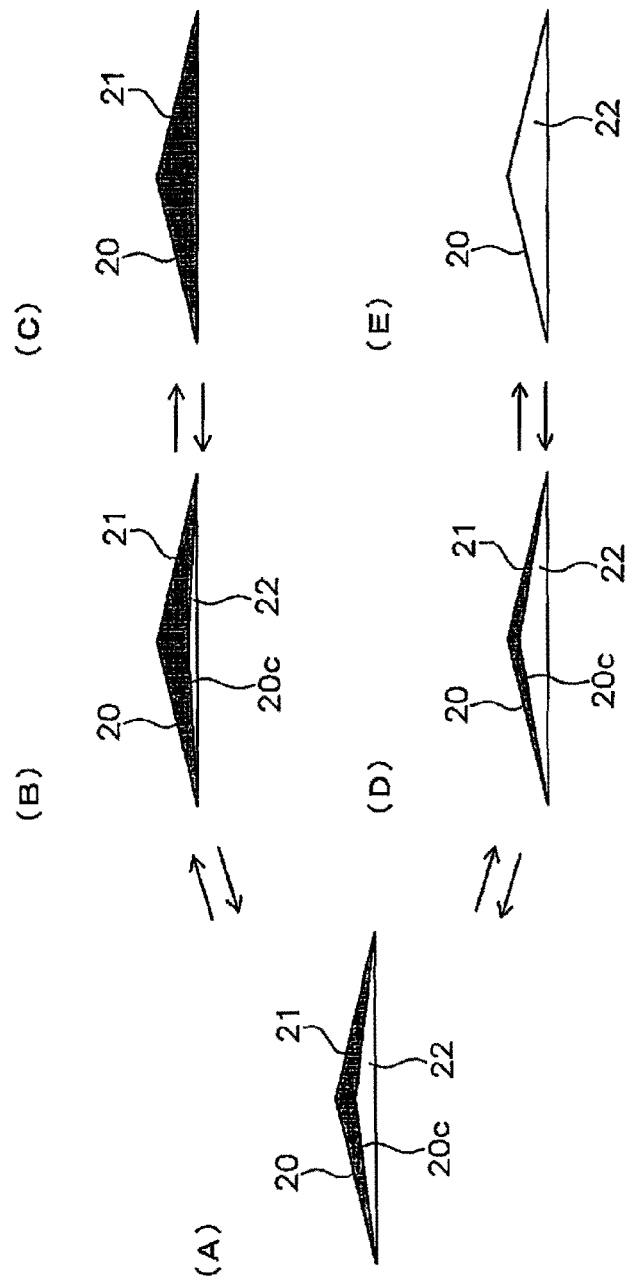
FIGS. 3(A) to 3(E) are cross sectional views of a rubber ribbon.

FIG. 2 shows the tread rubber 10 before being cured, and schematically describes a cross section of a rubber ribbon 20 which constructs the rubber ribbon winding body. The rubber ribbon 20 is a rubber ribbon obtained by combining a rubber 21 and a rubber 22 which are different in hardness from each other, and the rubber 21 and the rubber 22 are united on the boundary of a compound interface 20c as shown in FIG. 3. A ribbon interface between the rubber ribbons 20 and the compound interface 20c can be specified not only in the tire before being cured but also in the tire after being cured, and can be discriminated according to a nature of the rubber interface in a cross section of the tread rubber 10, for example, by cutting the tread rubber 10 by means of a sharp cutting tool.

As described already, the tread rubber 10 is formed by the ribbon winding construction method. The ribbon winding construction method is a construction method which forms a rubber member by spirally winding an uncured rubber ribbon having a small width in a tire circumferential direction. The rubber ribbon 20 has a flat cross sectional shape which is smaller in its thickness than in its width, and the compound interface 20c sections the rubber ribbon 20 in a thickness direction. The present embodiment employs a ribbon shape in which a thickness becomes smaller by smaller toward both ends in the width direction, and this shape is suitable for partly superposing the adjacent rubber ribbons in the width direction each other so as to be wound.

Figure 4:
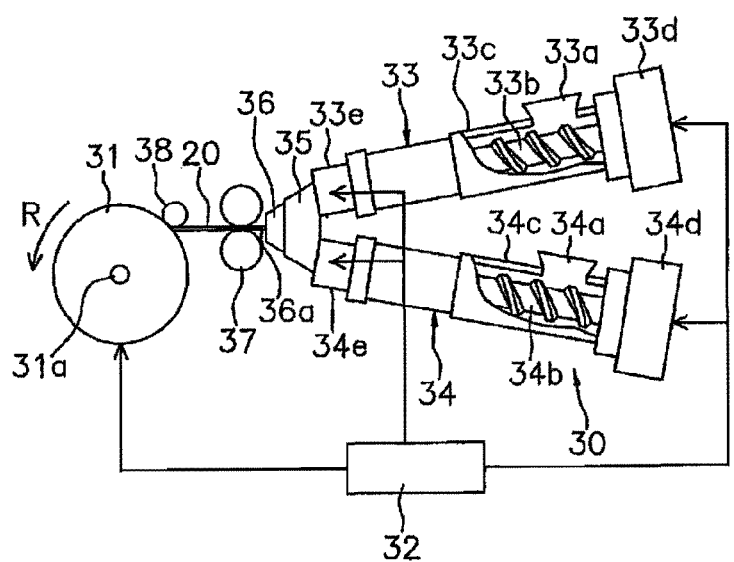
FIG. 4 is a view showing a manufacturing facility for winding the rubber ribbon.

The rubber ribbon 20 can be formed and wound by using a facility as exemplified in FIG. 4. The facility is provided with a rubber ribbon supply device 30 which can co-extrude two kinds of rubbers together so as to form the rubber ribbon 20, a rotary support body 31 serving as a wound body to which the rubber ribbon 20 supplied from the rubber ribbon supply device 30 is wound, and a control device 32 which controls actuations of the rubber ribbon supply device 30 and the rotary support body 31. The rotary support body 31 is structured such that it is rotatable in a direction R around a shaft 31a, and movable in an axial direction.

An extruder 33 is provided with a hopper 33a, a screw 33b, a barrel 33c, a drive unit 33d of the screw 33b, and a head portion 33e having a gear pump built-in. In the same manner, an extruder 34 is also provided with a hopper 34a, a screw 34b, a barrel 34c, a drive unit 34d, and a head portion 34e. A rubber combining portion 35 with a mouth piece 36 is provided in leading ends of a pair of extruders 33 and 34.

In the case that the rubber 21 is input to the hopper 33a and the rubber 22 is input to the hopper 34a, the respective rubbers are fed forward while being mixed by the screws 33b and 34b, pass through the head portions 33e and 34e, are combined into a predetermined shape in the rubber combining portion 35, and are extruded as the rubber ribbon 20 from a discharge port 36a. The formed rubber ribbon 20 is fed forward by a roll 37 and is wound to the rotary support body 31 while being pressed by a roller 38.

An extruding amount of each of the rubbers can be adjusted in the rubber ribbon 20 in process of winding by appropriately adjusting the rotation of the gear pump within each of the head portions 33e and 34e and adjusting the rotation of each of the screws 33b and 34b as needed. Accordingly, as shown in FIG. 3, it is possible to freely change a cross sectional area ratio of the rubber 21 in relation to the rubber ribbon 20 (accordingly, and a cross sectional area ratio of the rubber 22), by changing the compound interface 20c while maintaining the shape and the size of the extruded rubber ribbon. The actuation of the gear pumps within the head portions 33e and 34e and the screws 33b and 34b is controlled by the control device 32.

In FIG. 3, the rubber ribbons 20 in FIGS. 3(C) and 3(E) are constructed by a single layer, and the compound interface 20c is not retained. On the other hand, the other rubber ribbons 20 are constructed by a double layer, and the compound interface 20c is retained. The rubber ribbon 20 retaining the compound interface 20c includes both of the rubber 21 and the rubber 22. In FIG. 3(A), the cross sectional area ratio of the rubber 21 in relation to the rubber ribbon 20 is 50%, and the cross sectional area ratio of the rubber 22 is accordingly 50%. In FIGS. 3(B) and 3(C), the cross sectional area ratio of the rubber 21 in relation to the rubber ribbon 20 is greater than the cross sectional area ratio of the rubber 22, and FIGS. 3(D) and 3(E) have an opposite relationship thereto. FIG. 3 shows five stages, however, there are stages between these five stages.

Figure 5:
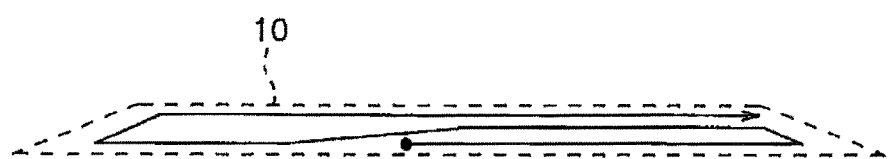
FIG. 5 is a conceptual view showing a moving route of a winding position of the rubber ribbon.

For forming the tread rubber 10, there is carried out a winding step of forming the rubber ribbon winding body by spirally winding the rubber ribbon 20 obtained by co-extruding the rubber 21 and the rubber 22 together. In the present embodiment, the rubber ribbon 20 is wound along a route which moves from a starting point in the center of the tread to a right end so as to turn back, subsequently moves to a left end so as to again turn back, and moves to a right end which is an end point, as shown in FIG. 5, however, the route is not limited to this. In the winding step, the winding position of the rubber ribbon 20 moves along the tread width direction between the center area Ce and the shoulder area Sh, and the mainly arranged rubber is differentiated between the center area Ce and the shoulder area Sh, in the process.

Specifically, the rubber 21 is mainly arranged in the center area Ce, by making the cross sectional area ratio of the rubber 21 in relation to the rubber ribbon 20 greater than the cross sectional area ratio of the rubber 22, that is, winding the rubber ribbon 20 in which the cross sectional area ratio of the rubber 21 is made greater than FIG. 3(A). As long as the rubber 21 is mainly arranged in the center area Ce, the rubber ribbon 20 in which the cross sectional area ratio of the rubber 21 is equal to or smaller than FIG. 3(A) may be partly included. It is preferable that the rubber ribbon 20 constructed by the single layer of rubber 21 as shown in FIG. 3(C) is included in the center area Ce.

On the other hand, the rubber 22 is mainly arranged in the shoulder area Sh, by making the cross sectional area ratio of the rubber 21 in relation to the rubber ribbon 20 smaller than the cross sectional area ratio of the rubber 22, that is, winding the rubber ribbon 20 in which the cross sectional area ratio of the rubber 21 is made smaller than FIG. 3(A). As long as the rubber 22 is mainly arranged in the shoulder area Sh, the rubber ribbon 20 in which the cross sectional area ratio of the rubber 21 is equal to or greater than FIG. 3(A) may be partly included. It is preferable that the rubber ribbon 20 constructed by the single layer of rubber 22 as shown in FIG. 3(E) is included in the shoulder area Sh.

Further, in the winding step, a portion in which the cross sectional area ratio of the rubber 21 in relation to the rubber ribbon 20 becomes smaller by smaller is provided from the center area Ce toward the shoulder area Sh. In the present embodiment, the cross sectional area ratio of the rubber 21 in relation to the rubber ribbon 20 is made smaller by smaller in a process that the winding position of the rubber ribbon 20 moves from the starting point to the right end, and a process that the winding position of the rubber ribbon 20 moves from the tread center to the left end after turning back at the first time. In the case that the portion mentioned above is provided, the direction moving the winding position of the rubber ribbon 20 is not particularly limited.

Further, in the winding step, the rubber ribbon 20 retaining the compound interface 20c is superposed and wound in the tread thickness direction to at least a part of the shoulder area Sh. Therefore, the rubber 21 is arranged in the shoulder area Sh while mainly including the rubber 22. Accordingly, in cooperation with the provision of the portion in which the cross sectional area ratio of the rubber 21 becomes smaller by smaller as mentioned above, any clear dividing surface is not formed between the center area Ce and the shoulder area Sh, but the rubber 21 and the rubber 22 are mixed. Therefore, a rapid hardness change between the areas can be suppressed.

In the single body of the rubber ribbon 20, the rubber 21 and the rubber 22 are superposed in layers on the boundary of the compound interface 20c, and the rubber 21 and the rubber 22 are superposed in layers on the boundary of the ribbon interface by superposing and winding the rubber ribbon 20 in the tread thickness direction. As a result, the rubber 21 and the rubber 22 are superposed in the tread thickness direction, and are arranged in a multilayer manner such as the millefeuille. In the winding step, the rubber ribbon 20 is wound so that the rubber ribbons 20 which are adjacent in the tread width direction partly superpose each other, and this structure is convenient for achieving the multilayer arrangement. In the present embodiment, the rubber ribbons 20 constructing the bottom surface of the rubber ribbon winding body retain the compound interface 20c.

A winding step in which the cross sectional area ratio of the rubber 21 in relation to the rubber ribbon 20 is changed as follows can be listed as an example. In other words, there can be thought the cross sectional area ratio is changed as follows in the process moving along the winding route in FIG. 5, starting point: 100%, between starting point and right end: 70%, right end: 30%, right end after turning back: 0%, between right end and tread center: 30%, tread center: 70%, between tread center and left end: 50%, left end: 30%, left end after turning back: 0%, between left end and tread center: 30%, tread center: 70%, between tread center and right end: 30%, right end: 0%.

The center area Ce highly contributes to steering stability performance in a low load area, and the shoulder area Sh highly contributes to ride comfort performance and noise performance. Therefore, in the case that the rubber 21 is harder than the rubber 22, the performance share is promoted between the center area Ce and the shoulder area Sh, and it is possible to achieve both the steering stability performance, and the ride comfort performance and the noise performance in a high order. In the case that the rubber 22 is arranged in the center area Ce, the steering stability performance in the low load area tends to be lowered, however, since the rubber 21 is arranged mainly in the center area Ce, a lowering margin is suppressed.

Further, since the rubber 21 is arranged in the shoulder area Sh while mainly including the rubber 22 as mentioned above, a rigidity of the land portion such as the block provided in the tread rubber 10 is improved in comparison with the case that the rubber 22 is singly arranged in the shoulder area Sh, and vibration damping performance of the land portion is improved. As a result, the ride comfort performance is improved as well as the steering stability performance in the high load area is improved, and it is possible to achieve both the performance in the high order. The effect of improving the performance as mentioned above can be effectively enhanced by arranging the rubber 21 and the rubber 22 in the shoulder area Sh in the multilayer manner.

In order to more improve the steering stability performance while suppressing the lowering margin of CP in the low load area, it is preferable to form the surface of the center area Ce by the rubber 21 in the winding step. Further, in order to improve the ride comfort performance and the noise performance while suppressing the input from the road surface, it is preferable to form the surface of the shoulder area Sh by the rubber 22 in the winding step. In the outer peripheral surface of the tread rubber 10, each of a surface area ratio of the rubber 21 in relation to the center area Ce, and a surface area ratio of the rubber 22 in relation to the shoulder area Sh is desirably equal to or more than 70%.

A difference in JISA hardness between the rubber 21 and the rubber 22 is preferably equal to or more than 2 degrees, or a difference in 300% tension modulus between the rubber 21 and the rubber 22 is preferably equal to or more than 1.0 MPa. The JISA hardness is a value which is measured at 25° C. according to a durometer hardness test (type A) of JISK6253. The 300% tension modulus is a value at 300% tension time in the case that a tension test is carried out at 25° C. according to JISK6251.

After the tread rubber 10 is formed after finishing the winding step, the step changes to a green tire forming step, and the green tire is formed by attaching the tread rubber 10 to the outer peripheral surface of the carcass 4 formed into the toroidal shape, and combining with the other tire constructing members. Thereafter, the step changes to a cure step so as to apply a curing process to the green tire, whereby the pneumatic tire shown in FIG. 1 is manufactured.

Second Embodiment

Since a second embodiment is similar to the first embodiment except the matters which are described below, a description will be mainly given of different points while omitting common points. The same reference numerals are attached to the same members and positions as those described in the first embodiment, and the same description will not be given.

Figure 6:
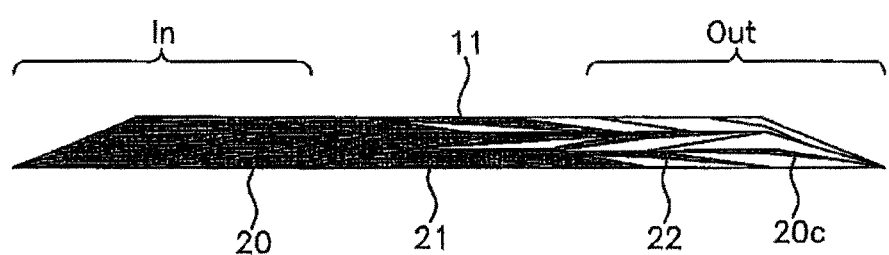
FIG. 6 is a cross sectional view showing the tread rubber before being cured.

FIG. 6 shows a tread rubber 11 before being cured, and schematically describes a cross section of a rubber ribbon 20 which constructs a rubber ribbon winding body. In the tread rubber 11, mainly arranged rubbers are different between an inside area In (corresponding to a first area) which is positioned in one side in a tread width direction and becomes an inner side of a vehicle at an installing time to the vehicle, and an outside area Out (corresponding to a second area) which is positioned in the other side in the tread width direction and becomes an outer side of the vehicle at the installing time to the vehicle. In other words, a rubber 21 (corresponding to a first rubber) is mainly in the inside area In, and a rubber 22 (corresponding to a second rubber) is mainly arranged in the outside area Out.

The tread rubber 11 is provided for manufacturing a pneumatic tire in which an installing direction to the vehicle is designated. In other words, the pneumatic tire provided with the tread rubber 11 is constructed as a tire in which the installing direction to the vehicle is designated. The designation of the installing direction is carried out, for example, by attaching a mark (for example, OUTSIDE) indicating a vehicle outside or a mark (for example, INSIDE) indicating a vehicle inside to an outer surface of a side wall portion 2.

The inside area In is an area which has a width based on a tread end, and the width is set to 20% of a tread width TW, preferably set to 30%, and more preferably set to 40%. The mainly arrangement of the rubber 21 in the inside area In means the matter that a cross sectional area ratio of the rubber 21 in relation to the tread rubber 11 in the inside area In is equal to or more than 50%, and the cross sectional area ratio is preferably equal to or more than 60%, and more preferably equal to or more than 70%. The surface of the inside area In is formed by the rubber 21, however, the rubber 22 may be partly exposed therein.

The outside area Out is an area which has a width based on the tread end, and the width is set to 20% of the tread width TW, preferably set to 30%, and more preferably set to 40%. The mainly arrangement of the rubber 22 in the outside area Out means the matter that a cross sectional area ratio of the rubber 22 in relation to the tread rubber 11 in the outside area Out is equal to or more than 50%, and the cross sectional area ratio is preferably equal to or more than 60%, and more preferably equal to or more than 70%. The surface of the outside area Out is formed by the rubber 22, however, the rubber 21 may be partly exposed therein.

For forming the tread rubber 11, there is carried out a winding step of forming the rubber ribbon winding body by spirally winding the rubber ribbon 20 obtained by co-extruding the rubber 21 and the rubber 22 together. In the present embodiment, the rubber ribbon 20 is wound along the route shown in FIG. 5. In the winding step, the winding position of the rubber ribbon 20 moves along the tread width direction between the inside area In and the outside area Out, and the mainly arranged rubber is differentiated between the inside area In and the outside area Out, in the process.

Specifically, the rubber 21 is mainly arranged in the inside area In, by making the cross sectional area ratio of the rubber 21 in relation to the rubber ribbon 20 greater than the cross sectional area ratio of the rubber 22, that is, winding the rubber ribbon 20 in which the cross sectional area ratio of the rubber 21 is made greater than FIG. 3(A). As long as the rubber 21 is mainly arranged in the inside area In, the rubber ribbon 20 in which the cross sectional area ratio of the rubber 21 is equal to or smaller than FIG. 3(A) may be partly included. It is preferable that the rubber ribbon 20 constructed by the single layer of rubber 21 as shown in FIG. 3(C) is included in the inside area In, and only the rubber ribbon 20 of the single layer as mentioned above is arranged in the present embodiment.

On the other hand, the rubber 22 is mainly arranged in the outside area Out, by making the cross sectional area ratio of the rubber 21 in relation to the rubber ribbon 20 smaller than the cross sectional area ratio of the rubber 22, that is, winding the rubber ribbon 20 in which the cross sectional area ratio of the rubber 21 is made smaller than FIG. 3(A). As long as the rubber 22 is mainly arranged in the outside area Out, the rubber ribbon 20 in which the cross sectional area ratio of the rubber 21 is equal to or greater than FIG. 3(A) may be partly included. It is preferable that the rubber ribbon 20 constructed by the single layer of rubber 22 as shown in FIG. 3(E) is included in the outside area Out.

Further, in the winding step, a portion in which the cross sectional area ratio of the rubber 21 in relation to the rubber ribbon 20 becomes smaller by smaller is provided from the inside area In toward the outside area Out. In the present embodiment, the cross sectional area ratio of the rubber 21 in relation to the rubber ribbon 20 is made smaller by smaller in a process that the winding position of the rubber ribbon 20 moves from the starting point to the right end, and the rubber ribbon 20 is constructed by the single layer of the rubber 21 in a process that the winding position moves from the tread center to the left end after turning back in the right end. In the case that the portion mentioned above is provided, the direction moving the winding position of the rubber ribbon 20 is not particularly limited.

Further, in the winding step, the rubber ribbon 20 retaining the compound interface 20c is superposed and wound in the tread thickness direction to at least apart of the outside area Out. Therefore, the rubber 21 is arranged in the outside area Out while mainly including the rubber 22. Accordingly, any clear dividing surface is not formed between the inside area In and the outside area Out, but the rubber 21 and the rubber 22 are mixed. As a result, a rapid hardness change between the areas can be suppressed. In the outside area Out, the rubber 21 and the rubber 22 are superposed in the tread thickness direction, and are arranged in a multilayer manner such as the millefeuille.

A winding step in which the cross sectional area ratio of the rubber 21 in relation to the rubber ribbon 20 is changed as follows can be listed as an example. In other words, there can be thought the cross sectional area ratio is changed as follows in the process moving along the winding route in FIG. 5, starting point: 100%, between starting point and right end: 70%, right end: 30%, right end after turning back: 0%, between right end and tread center: 30%, tread center: 70%, between tread center and left end: 100%, left end: 100%, left end after turning back: 100%, between left end and tread center: 100%, tread center: 70%, between tread center and right end: 30%, right end: 0%.

The inside area In highly contributes to steering stability performance in a low load area, and the outside area Out highly contributes to ride comfort performance and noise performance. Therefore, in the case that the rubber 21 is harder than the rubber 22, the performance share is promoted between the inside area In and the outside area Out, and it is possible to achieve both the steering stability performance, and the ride comfort performance and the noise performance in a high order. In the case that the rubber 22 is arranged in the inside area In, the steering stability performance in the low load area tends to be lowered, however, since the rubber 21 is arranged mainly in the inside area In, a lowering margin is suppressed.

Further, since the rubber 21 is arranged in the outside area Out while mainly including the rubber 22 as mentioned above, a rigidity of the land portion such as the block provided in the tread rubber 11 is improved in comparison with the case that the rubber 22 is singly arranged in the outside area Out, and vibration damping performance of the land portion is improved. As a result, the ride comfort performance is improved as well as the steering stability performance in the high load area is improved, and it is possible to achieve both the performance in the high order. The effect of improving the performance as mentioned above can be effectively enhanced by arranging the rubber 21 and the rubber 22 in the outside area Out in the multilayer manner.

In order to more improve the steering stability performance while suppressing the lowering margin of CP in the low load area, it is preferable to form the surface of the inside area In by the rubber 21 in the winding step. Further, in order to improve the ride comfort performance and the noise performance while suppressing the input from the road surface, it is preferable to form the surface of the outside area Out by the rubber 22 in the winding step. In the outer peripheral surface of the tread rubber 11, each of a surface area ratio of the rubber 21 in relation to the inside area In, and a surface area ratio of the rubber 22 in relation to the outside area Out is desirably equal to or more than 70%.

Other Embodiments

Figure 7:
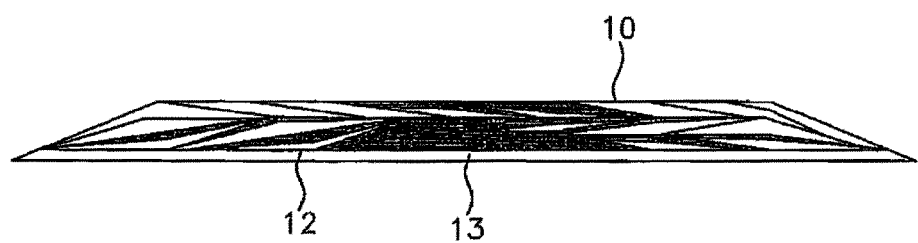
FIG. 7 is a cross sectional view showing the tread rubber before being cured.

As shown in FIG. 7, the tread rubber 10 may be structured such as to have a cap portion 12 which constructs a ground-contacting surface, and a base portion 13 which is provided in an inner side of the cap portion 12. In this case, the rubber ribbon winding body may construct at least the cap portion 12, and the formation of the base portion 13 can utilize any one of the ribbon winding construction method and an extrusion molding method. The extrusion molding method is a construction method which extrudes an uncured band-like rubber member having a predetermined cross sectional shape and joins end portions thereof to each other so as to annularly form. The same applies to the tread rubber 11.

In the embodiment mentioned above, there is shown the example in which the first rubber mainly arranged in the first area (the center area or the inside area) is harder than the second rubber mainly arranged in the second area (the shoulder area or the outside area), however, it can be thought that these rubbers are arranged inversely depend on performance to be improved.

The present invention is not limited to the embodiment mentioned above, but can be improved and modified variously within the scope of the present invention.

EXAMPLES

An example which concretely shows the structure and effect of the present invention will be explained. An evaluation of each of performances is executed as follows.

(1) Steering Stability Performance

A cornering force was determined as a cornering power (CP) by using a flat belt type cornering tester, the cornering force being generated in a tire in the case that the tire on the belt is traveled at a speed of 10 km/h and a slip angle of 1 degree is applied. Two different loads (a low load and a high load) are independently applied to the tire, and a low load area CP and a high load area CP at this time were respectively set to an index of the steering stability performance. Results of working examples 1 and 2 are evaluated by an index which is obtained by setting results of comparative examples 1 and 2 to 100, and the greater numerical value indicates the more excellent steering stability performance.

(2) Ride Comfort Performance

The tire was installed to an actual car and was set to a pneumatic pressure designated by the vehicle, and the ride comfort performance was evaluated by a driver's subjective test by executing a straight travel and a turning travel on a dry road. Results of the working examples 1 and 2 are evaluated by an index which is obtained by setting results of comparative examples 1 and 2 to 100, and the greater numerical value indicates the more excellent ride comfort.

(3) Noise Performance

The tire was installed to the actual car and was set to the pneumatic pressure designated by the vehicle, a sound pressure of an ear position in a driver seat was measured in the case of traveling on a rough road surface at a speed of 60 km/h, and a ratio of an energy amount in one third octave band was evaluated. Results of the working examples 1 and 2 are respectively evaluated on the basis of an index which is obtained by setting results of the comparative examples 1 and 2 to 100, and the greater numerical value indicates the more excellent noise performance.

Figure 8:
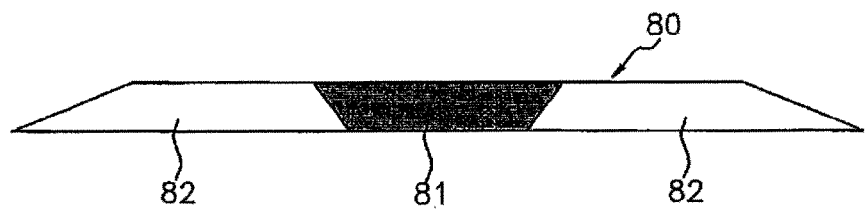
FIG. 8 is a view showing a conventional tread rubber.
Figure 9:
FIG. 9 is a view showing a conventional tread rubber.

In the tire achieving the performance share between the center area and the shoulder area, the tire having the tread rubber in FIG. 8 formed according to the extrusion molding method was set to the comparative example 1, and the tire having the tread rubber in FIG. 2 formed according to the ribbon winding construction method was set to the working example 1. Further, in the tire achieving the performance shear between the inside area and the outside area, the tire having the tread rubber in FIG. 9 formed according to the extrusion molding method was set to the comparative example 2, and the tire having the tread rubber in FIG. 6 formed according to the ribbon winding construction method was set to the working example 2. The size of the tires provided for evaluation is 215/55R17, and tire structures and rubber compositions in the respective examples are common except the structure of the tread rubber.

TABLE 1

|  |  | Comparative example 1 | Working example 1 |
|---|---|---|---|
| Steering stability performance | Low load area CP | 100 | 103 |
|  | High load area CP | 100 | 102 |
| Ride comfort performance |  | 100 | 99 |
| Noise performance |  | 100 | 105 |

TABLE 2

|  |  | Comparative example 2 | Working example 2 |
|---|---|---|---|
| Steering stability performance | Low load area CP | 100 | 103 |
|  | High load area CP | 100 | 102 |
| Ride comfort performance |  | 100 | 99 |
| Noise performance |  | 100 | 105 |

As shown in Table 1, the working example 1 can achieve both the steering stability performance in the high load area, and the ride comfort performance and the noise performance in the high order, in comparison with the comparative example 1, while securing the steering stability performance in the low load area. Further, as shown in Table 2, the working example 2 can achieve both the steering stability performance in the high load area, and the ride comfort performance and the noise performance in the high order, in comparison with the comparative example 2, while securing the steering stability performance in the low load area.

What is claimed is:

1. A method of manufacturing a pneumatic tire having a tread rubber, the method comprising:

a winding step of forming a rubber ribbon winding body constructing the tread rubber by spirally winding a rubber ribbon obtained by co-extruding a first rubber and a second rubber which are different in hardness and wherein the rubber ribbon has a flat cross sectional shape in which a thickness is smaller than a width, in the winding step the first rubber and the second rubber of the rubber ribbon are co-extruded in differing amounts between a first area positioned in a center portion and a second area positioned in an end portion in a tread width direction, or between a first area positioned in one side and a second area positioned in the other side in the tread width direction, the tread rubber consisting of the first area and the second area, wherein an amount of the first rubber is greater in the first area by making a cross sectional area ratio of the first rubber in relation to the rubber ribbon greater than a cross sectional area ratio of the second rubber, and an amount of the second rubber is greater in the second area by making the cross sectional area ratio of the first rubber in relation to the rubber ribbon smaller than the cross sectional area ratio of the second rubber, the cross sectional area ratio of the first rubber in relation to the rubber ribbon becomes progressively smaller and the cross sectional area ratio of the second rubber in relation to the rubber ribbon becomes progressively larger in a part of the first area as the second area approaches, an interface boundary in the rubber ribbon between the first rubber and the second rubber in the rubber ribbon is retained in the part of the first area as the second area approaches, the interface boundary is a boundary formed by overlapping the co-extruded first rubber and second rubber, the winding step winds the rubber ribbon in a tire circumferential direction around a support body so that the rubber ribbon partially overlaps an adjacent portion of the rubber ribbon wound onto the support body in a tread thickness direction, the winding step winds the rubber ribbon in a multilayer manner, and forms the first rubber at a surface of the first area, and the second rubber at a surface of the second area, the cross sectional area ratio of the first rubber in relation to the rubber ribbon is 100% in a portion of the first area, and the rubber ribbon present in the whole of the second area consists of both the first rubber and the second rubber but the cross sectional area ratio of the second rubber in relation to the rubber ribbon is 70% or more in a portion of the second area.

2. The method of manufacturing the pneumatic tire according to claim 1, wherein the first rubber is harder than the second rubber, and wherein the first area is a center area which is positioned in a center portion in the tread width direction, and the second area is a shoulder area which is positioned in an end portion in the tread width direction.

3. The method of manufacturing the pneumatic tire according to claim 1, wherein the first rubber is harder than the second rubber.

4. The method of manufacturing the pneumatic tire according to claim 1, wherein a difference in JISA hardness between the first rubber and the second rubber is equal to or more than 2 degrees, or a difference in 300% tension modulus between the first rubber and the second rubber is equal to or more than 1.0 MPa, wherein the JISA hardness is a value which is measured at 25° C. according to a durometer hardness test (type A) of JISK6253, and wherein the 300% tension modulus is a value measured by a tension test carried out at 25° C. according to JISK6251.

* * * * *